United States Patent Office 3,575,792
Patented Apr. 20, 1971

3,575,792
ADHESION OF CORD FABRIC TO
VULCANIZED ELASTOMERS
Harald Blumel and Gerhard Berg, Marl, Germany, assignors to Chemische Werke Hüls A.G., Marl, Germany
No Drawing. Filed Feb. 13, 1968, Ser. No. 704,999
Claims priority, application Germany, Feb. 14, 1967,
C 41,501
Int. Cl. B32b 27/32, 27/04, 32/08
U.S. Cl. 161—241                              10 Claims

ABSTRACT OF THE DISCLOSURE

The adhesion of cord webs to vulcanized elastomers of ethylene, at least one other α-monoolefin and at least one polyunsaturated unconjugated olefin by impregnation with resorcinol/formaldehyde latex mixtures is improved when from 0.01–10 parts by weight of poly(conjugated)diolefin, based on 100 parts by weight of said elastomers, is admixed with the elastomers.

BACKGROUND OF THE INVENTION

The present invention relates generally to compositions and methods for bonding tire reinforcement to rubber and the improved structure obtained thereby, and is particularly related to the bonding of tire cord to elastomeric copolymerizates of ethylene with α-monoolefins.

In the manufacture of automobile tires, reinforcing materials, including cord and fabric made therefrom, are incorporated in the tire structure to improve the properties thereof. This reinforcing cord may be a natural textile, such as cotton, a cellulose material, such as rayon, a polyamide reaction product as, for example, nylon, or a polyester product, such as Dacron.

In bonding the reinforcement cord to the rubber, so-called adhesive media used are usually latex systems together with elastomer mixtures with which the textile fabrics are impregnated before they are processed. An adhesive medium widely used in the tire industry is a resorcinol-formaldehyde-resin-containing latex. This resin-latex mixture is obtained by condensing resorcinol with formaldehyde under alkaline conditions followed by combining the thus-produced aqueous solution of the resin-containing condensation products with a rubber latex. The condensation can take place in the rubber-latex. Suitable latices are natural rubber latex and synthetic rubber latices, for example, emulsion copolymerizates of butadiene and styrene.

Reference is made to pending application Ser. No. 548,042, filed May 6, 1966, now U.S. Pat. No. 3,476,642, the disclosure of which is incorporated herein.

The quality of rubber articles reinforced with textile is dependent upon the adhesion between a vulcanized mixture of elastomers and fiber or cord. Special adhesive media are required.

Adhesive media are, for example, latex systems with which the textile is impregnated before being processed with elastomer mixtures. One adheive medium used to a large extent in the tire industry is a resorcinol-formaldehyde-resin-containing latex. The preparation of such a resin-latex mixture has already been referred to.

Unfortunately, such resin-latex combinations are generally unusable as adhesive media when the vulcanized mixture of elastomers contains, as the elastomeric component, copolymers of ethylene, another α-olefin and a polyunsaturated olefin, heerinafter also referred to as a multiene, e.g., so-called "unsaturated ethylene-propylene rubber," since the resulting adherence is completely inadequate. The inadequacy is partially due to the differing vulcanization velocities of the ethylene-propylene rubber and the polydiene rubber of the latices.

For this reason, the impregnation of textiles, such as cord fibers which are to be vulcanized into elastomeric mixtures from copolymerizates of ethylene with α-olefins and multienes, can be effected only with those adhesive media wherein the elastomeric component also consists of unsaturated copolymerizates of ethylene with α-olefins and multienes.

SUMMARY OF THE INVENTION

Wherever a textile, e.g., cord web, preferably of rayon, nylon or polyester, is incorporated in a vulcanized elastomer of ethylene, at least one other α-monoolefin and at least one multiene or a mixture of such elastomers by impregnating the textile with a resorcinol/formaldehyde resin-latex mixture, the adhesion of the textile to the vulcanized elastomer(s) is improved by incorporating in the elastomer(s) from 0.01–10, preferably from 0.05–1, part by weight, based on 100 parts by weight of the elastomer, of polydiolefin.

It is thus an object of the invention to improve the adhesion of textile to unsaturated ethylene-propylene rubber.

Another object is to increase the adhesive strength obtainable by mixing synthetic resin latices with dispersions of, e.g., polyvinyl pyridine or polyoxazoline.

A further object is to provide a practical and commercially acceptable adhesion between textile and the noted type of elastomer and the compositions suitable for obtaining this end.

Upon further study of the specification and claims, other objects and advantages of the present invention will become apparent.

DETAILED DISCUSSION OF THE INVENTION

Elastomers of ethylene, at least one other α-monoolefin and at least one multiene are those elastomers or copolymerizates of from 35–85, preferably 50–70 mol percent of ethylene, 15–65, preferably 30–50 mol percent of propylene or α-butylene, and 0.1–20, preferably 0.5–10 mol percent of at least one multiene of at least 2 unconjugated ethylenically unsaturated double bonds and preferably 3–20 carbon atoms.

Exemplary suitable multienes are unconjugated compounds and include, but are not limited to dicyclopentadiene, cyclooctadiene-1,5, and addition products of cyclopentadiene with multienes, such as butenylnorbornene.

The elastomers are prepared by conventional copolymerization with Ziegler-type catalysts. Particularly suitable catalysts are mixed catalysts of organometallic compounds of Groups I to III of Mendeleev's Periodic Table, on the one hand, and compounds of the metals of Subgroups IV to VI, as well as VIII of the Periodic Table, on the other hand. Particularly suitable are mixed catalysts of organoaluminum compounds and vanadium compounds. Preferred organoaluminum compounds are, for example, diethylaluminum chloride, preferably ethylaluminum sesquichloride. Vanadium compounds which can be used are, for example, vanadium tetrachloride, vanadium triacetylacetonate and preferably vanadium oxychloride. Said elastomers are either employed as such, in the form of mixtures with one another, or in accordance with a particularly advantageous embodiment, in the form of mixtures thereof with other auxiliary agents or additives for the rubber, such as fillers, plasticizers, metallic oxides, higher fatty acids and, optionally, vulcanization agents and/or accelerators, as well as other additives and auxiliary agents used in the rubber industry.

The polydiolefins usable in this invention include natural rubber as well as homopolymers of conjugated diolefins of 4–5 carbon atoms such as, for example, 2-methylbutadiene-(1,3), butadiene-(1,3), and 2-chlorobutadiene.

In addition, the polydiolefins comprise rubbery copolymers of such conjugated diolefins with α-monoolefins such as acrylonitrile, styrene, or styrene derivatives, such as lower alkyl-substituted styrene, e.g., methyl styrene substituted at any position. Generally, the conjugated diolefins comprise about 1 to 50 weight percent of such copolymers. These copolymers can be either statistical or in the form of block copolymers.

Such homo- and copolymers of diolefins are prepared by conventional methods, for example by free radical emulsion polymerization, or by solution polymerization with organometallic mixed catalysts. The Mooney viscosity range of this polymers is between ML-4=25 and ML-4=120 as well for polydiene as for EPDM rubbers.

The mixing technique for the blending of the polymers can be a "dry" mixing process in an internal mixer or on a rubber mill—either by premixing the polymers and then adding black, oil etc. or by compounding separate batches which have to be blended later—or the polymer blending can be done by a "wet" process by mixing the latices together.

The latex employed for the impregnation is an aqueous latex obtained by dispersing an organic solvent solution of an above-noted unsaturated ethylene-mono-α-olefin elastomer in, e.g., hexane, heptane, or benzene with the aid of a dispersing device, such as a rapid agitator, in 0.2–5, preferably 0.4–1.5, times the amount of an aqueous emulsifier solution.

Anionic substances, preferably alkylaryl sulfonates, alkyl sulfonates and alkyl sulfates, as well as nonionic compounds, such as condensation products of phenols and alcohols with ethylene oxide, are employed as emulsifier.

The surface-active substances are employed by themselves or in combination with each other and/or with highmolecular protective colloids, such as polyvinyl alcohol, casein, glue and cellulose derivatives. The amount of emulsifier is 0.1–1%, based on the weight of the solution of polymerizate. The dispersion of the ethylenic copolymerizate solution is conducted at room temperature. After emulsification, the solvent introduced with the solution is removed by distillation at atmospheric or reduced pressure. The remaining latices can be concentrated by conventional methods, such as removing the water by distillation, adding creaming agents or centrifuging. The last-noted processes are particularly advantageous since a large portion of excess emulsifier is removed thereby.

The adhesive strength of the latices is improved by peroxide groups which can be incorporated by the subsequent addition of peroxides thereto. Alternatively, peroxides can be admixed with a polyvinyl pyridine or polyoxazoline dispersion wherein the weight ratio of unsaturated ethylenepropylene rubber-type polymer:polyvinyl pyridine (or polyoxazoline) can vary from 99:1 to 70:30, and preferably ranges from 95:5 to 85:15.

Suitable peroxides for this purpose are, e.g., benzoylperoxide, lauroylperoxide.

The resorcinol-formaldehyde resin component is obtained by the condensation of resorcinol and formaldehyde in an aqueous-alkaline solution. The weight ratio of resorcinol:formaldehyde can range between 10:1 and 1:1 and is preferably 11:6. The resin is employed in an amount of 2.5–50% by weight, preferably 10–25% by weight, based on the latex solids.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

(a) Production of the unsaturated ethylene-α-monoolefin copolymerizate latex

Ten kilograms of a 5% solution of an ethylene-propylene-dicyclopentadiene terpolymer, containing 40 molar percent propylene and 1.2 molar percent dicyclopentadiene, containing 8 C=C double bonds per 1000 carbon atoms, in benzene, are dispersed in a dispersing device known commercially as an "Ultra-Turrax Mixer" at room temperature in 10 kg. of an aqueous emulsifier solution containing 70 g. of tetrapropylene benzene sulfonate, 20 g. of nonylphenoltrigintaglycol ether, 10 g. of a naphthalene-sulfonic acid-formaldehyde condensation product, and 2 kg. of methanol. From the thus-obtained emulsion, the benzene is removed by distillation. The latex of about 7 to 8% solids is concentrated to 40 to 60% solids by centrifuging or by the addition of creaming agents. In this connection, all percentages given in the examples are weight percentages. The number of C=C double bonds per 1000 carbon atoms is determined by the chemical addition of iodine monochloride to the double bonds at 20° C. in carbon tetrachloride.

(b) Production of the polyvinyl pyridine dispersion

Two hundred grams of freshly distilled vinyl pyridine are dispersed for 10 minutes in 800 cc. of water containing 4 g. of tetrapropylene benzene sulfonate and, after the addition of 4 g. "Trigonox A 75" (a mixture of 75% tert.-butyl hydroperoxide and 25% di-tert.-butyl peroxide), for a period of another 2 minutes, in an "Ultra-Turrax Mixer." The emulsion is mixed at 20° C. with 40 cc. of a 10% aqueous tetraethylenepentamine solution. The polymerization temperature is likewise 20° C. After 6 hours, the reaction is terminated. The latex has a solids content of 20%.

(c) Preparation of the impregnating mixture by mixing the latices produced according to (a) and (b)

With stirring, 2,000 g. of a copolymerizate latex produced as described in (a) are combined with 500 g. of the 20% polyvinyl pyridine dispersion (b). The solids content is 40%.

(d) Production of the resorcinol-formaldehyde resin solution

Eleven grams of resorcinol are dissolved in 195 g. of distilled water, and there are added with stirring 20 g. of 30% formaldehyde solution, as well as 40 g. of a 1% sodium hydroxide solution. This mixture is allowed to mature for about 16 hours in darkness at room temperature. The solution contains 6.4% of resin solids. The molar ratio of resorcinol:formaldehyde is 1:2.

(e) Production of the impregnating mixture 250 g. of a 40% ethylene-propylene unsaturated rubber latex described under (c) are diluted with 84 g. of distilled water and mixed with 266 g. of resorcinol-formaldehyde resin solution (d) with stirring. The mixture contains 11.7% total solids. The ratio of resin:ethylene-propylene unsaturated rubber latex solids is, in this example, 18:100.

(f) Testing the adhesive strength of the rubber/textile bonded bodies

Cord fibers are passed under tension through the impregnating mixture (e) in an impregnating apparatus, as well as through a tube heated by high frequency wherein the fibers are dried. The fibers absorb about 6% of dry substance, based on the weight of the fibers.

The dried fibers are heated for 20 minutes at 150° C. The thus-treated fibers are inserted, under a tension (stress) of 1 kg., into the embedding mixture provided in a mold. The mold receives 24 fibers which are surrounded on both sides by 2 cm. broad strips of the embedding mixture.[1] The compression pressure in the mold is about 20 kg./cm.$^2$; this pressure is maintained constant by spring rings. The vulcanization is effected in 1 hour at 170° C.

---
[1] Solid vulcanizable composition of rubber and additives as set forth in Table 1.

The test bodies for the static test of adhesive strength are produced by dividing the vulcanized bonded body strip. After the tempering of the rubber pieces at 80° C., the adhesive strength of the vulcanized cord/fiber is determined by means of a tensile testing machine. Since the length of vulcanized fiber is 20 mm., the adhesive strength is stated in kg./20 mm. The values set forth are average values from at least 6 individual tests.

The dynamic test is conducted at 80° C. in a suitable apparatus (e.g., Bayer, Mitteilungen für die Gummi-Industrie [Information for the Rubber Industry], No. 29, p. 73). The time required, after applying varying loads, to detach the vulcanized cord fiber from the embedding mixture is determined in minutes. The average value is calculated from at least 6 individual values. The cord employed in this connection is S/S Rayon, Td 1 650/2, 480/480 ZS.

In Table 2, the test data for the static and dynamic cord adherence tests of mixture A (indicated in Table 1) are compared to those of mixture B of the present invention. The impregnated cord fibers are embedded in these mixtures. As can be seen therefrom, mixture B contains natural rubber, the latter being employed in the form of a mixture having the composition C in an amount of 0.5% based on the elastomer hydrocarbon. The improvement of the test values of B as compared to A is readily apparent.

TABLE 3

| Mixture | Cord adhesion static (kg./2 cm.) | Cord adhesion dynamic (minutes) |
|---|---|---|
| A | 7.5 | 160 |
| D | 7.8 | 245 |

EXAMPLE 3

This example describes in a manner analogous to that of Example 2 the use of a Ziegler-catalyzed polybutadiene rubber in accordance with this invention. The polybutadiene rubber (0.5% by weight of mixture G based on the weight of elastomer hydrocarbon) employed is that of mixture F. Table 4 indicates the static and dynamic cord adhesion values of comparative mixture A and mixture F.

TABLE 4

| Mixture | Cord adhesion static (kg./2 cm.) | Cord adhesion dynamic (minutes) |
|---|---|---|
| A | 7.5 | 160 |
| F | 7.8 | 245 |

It is to be noted that the unsaturated ethylene-α-monoolefin copolymers of this invention generally contain

TABLE 1

| | Mixture | | | | | | |
|---|---|---|---|---|---|---|---|
| | A | B | C | D | E | F | G |
| Unsaturated ethylene-propylene rubber, oil-extended. Oil content: 37.5 parts of naphthenic mineral oil to 100 parts of unsaturated ethylene-propylene rubber containing about 4% by weight of dicyclopentadiene. $C_3$ content: about 45% [1] | 73.5 | 73.5 | | 73.5 | | 73.5 | |
| Unsaturated ethylene-propylene rubber, not oil-extended. $C_3$ content: about 45%. Dicyclopentadiene content: about 4% by weight [1] | 26.5 | 26.5 | | 26.5 | | 26.5 | |
| Natural rubber, sheets, deformation 1200 | | 0.500 | 100.0 | | | | |
| Butadiene-styrene cold rubber, type 1500 | | | | 0.500 | 100.0 | | |
| Polybutadiene rubber, cis content>95% | | | | | | 0.500 | 100.0 |
| HAF (high abrasion furnace) carbon black | 15.0 | 15.238 | 47.5 | 15.238 | 47.5 | 15.238 | 47.5 |
| SRF (semireinforcing furnace) carbon black | 20.0 | 20.000 | | 20.000 | | 20.000 | |
| Zinc oxide | 3.0 | 3.015 | 3.0 | 3.015 | 3.0 | 3.015 | 3.5 |
| Stearic acid | | 0.001 | 2.0 | 0.001 | 2.0 | 0.001 | 2.0 |
| Phenyl-β-naphthylamine | | 0.005 | 1.0 | 0.005 | 1.0 | 0.005 | 1.0 |
| N-phenyl-N'-isopropyl-p-phenylenediamine | | 0.005 | 1.0 | 0.005 | 1.0 | 0.005 | 1.0 |
| Ozocerite | | 0.005 | 1.0 | 0.005 | 1.0 | 0.005 | 1.0 |
| Aromatic mineral oil | | 0.040 | 8.0 | 0.040 | 8.0 | 0.040 | 8.0 |
| Sulfur | 1.0 | 1.000 | | 1.000 | | 1.000 | |
| Tetramethyl thiuram monosulfide | 1.3 | 1.300 | | 1.300 | | 1.300 | |
| Total | 140.3 | 141.109 | 163.5 | 141.108 | 163.5 | 141.108 | 163.5 |

[1] Mooney value (ML-4) at 100° C.: about 45.

TABLE 2

| Mixture | Cord adhesion static (kg./2 cm.) | Cord adhesion dynamic (minutes) |
|---|---|---|
| A | 7.5 | 160 |
| B | 8.1 | 270 |

EXAMPLE 2

The preparation of the impregnating latex and of the resin-latex mixture, the impregnation of the fibers, the production of the test bodies, and the testing procedures are conducted as described in Example 1. In place of the natural rubber or the natural rubber mixture, a mixture of butadiene-styrene cold rubber of the type 1,500 is employed. The mixture composition of mixture D (Table 1) shows that the amount of butadiene-styrene cold rubber is equal, namely 0.5%, to that of natural rubber used in Example 1. Here, too, the butadiene-styrene cold rubber is equal, namely 0.5%, to that of natural rubber used in Example 1. Here, too, the butadiene-styrene cold rubber is employed as in Example 1 by the addition of a mixture having the composition E. The adhesive values of mixture D, as compared to those of mixture A, are presented in Table 3.

about 2.5–20, preferably 6–15 C=C double bonds per 1,000 carbon atoms.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly equitably and intended to be, within the full range of equivalence of the following claims.

What is claimed is:

1. In a bonded composite structure comprising a reinforcing cord embedded in a vulcanized rubber and bonded thereto under the influence of heat by an adhesive composition comprising an emulsified mixture of:
   (a) a copolymer of 35–85 mol percent of ethylene, 15–65 mol percent of an α-monoolefin selected from the group consisting of propylene and α-butylene, and 0.1–20 mol percent of a polyunsaturated unconjugated olefin; and (b) 2.5–50% by weight, based on the weight of all polymeric solids, of a resorcinol formaldehyde resol wherein the weight ratio of resorcinol:formaldehyde is from 10:1 to 1:1, the improvement wherein the vulcanized rubber comprises a terpolymer of 35–85 mol percent of ethylene, 15–65 mol percent of an α-monoolefin selected from the group consisting of propylene and α-butylene, and 0.1–20 mol percent of a polyunsaturated unconjugated olefin in intimate admixture with 0.01–10% by weight of poly (conjugated) diolefin, based on the weight of said terpolymer.

2. A bonded composite structure according to claim 1 wherein said poly (conjugated) diolefin is natural rubber.

3. A bonded composite structure according to claim 1 wherein said poly (conjugated) diolefin is butadiene/styrene cold rubber.

4. A bonded composite structure according to claim 1 wherein said poly (conjugated) diolefin is polybutadiene.

5. A bonded composite structure as defined by claim 1 wherein 0.5–1% of said poly (conjugated) diolefin is admixed.

6. A bonded composite structure as defined by claim 1 homopolymer selected from the group consisting of polyvinyl pyridine and polyoxazoline in a weight ratio to (a) of 1:99 to 30:70, respectively.

7. A bonded composite structure as defined by claim 1 wherein said polyunsaturated unconjugated olefin is selected from the group consisting of dicyclopentadiene, cyclooctadiene-1,5, and butenyl norbornene.

8. In a method of bonding textile to a solid elastomeric unsaturated copolymer of ethylene and at least one other α-monoolefin comprising:

(1) first impregnating the textile with an aqueous emulsion comprising:
  (a) a copolymer of 35–85 mol percent of ethylene, 15–65 mol percent of an α-monoolefin selected from the group consisting of propylene and α-butylene, and 0.1–20 mol percent of a polyunsaturated unconjugated olefin, and
  (b) 2.5–50% by weight, based on the weight of all polymeric solids, of a resorcinol/formaldehyde resol wherein the weight ratio of resorcinol:formaldehyde is from 10:1 to 1:1;
(2) embedding the textile into said solid unsaturated polymer; and
(3) vulcanizing the resultant mass, the improvement, preceding said embedding step, comprising intimately admixing with said solid unsaturated copolymer 0.01–10% by weight of a poly (conjugated) diolefin, based on the weight of said copolymer.

9. A method according to claim 8 wherein 0.05–1% by weight of the poly (conjugated) diolefin is admixed.

10. A method according to claim 8 wherein the poly (conjugated) diolefin is selected from the group consisting of natural rubber, butadiene/styrene cold rubber and polybutadiene.

References Cited
UNITED STATES PATENTS 3,476,642   11/1969   Berg et al.   161—227

LELAND A. SEBASTIAN, Primary Examiner

U.S. Cl. X.R.

156—110, 334, 335; 161—227, 231, 242, 248; 260—29.3, 29.7, 33.6, 846, 848, 887, 895, 897

UNITED STATES PATENT OFFICE
CERTIFICATE OF CORRECTION

Patent No. 3,575,792        Dated April 20, 1971

Inventor(s) Harald Blumel and Gerhard Berg

It is certified that error appears in the above-identified patent and that said Letters Patent are hereby corrected as shown below:

In the Claims:

Claim 6, lines 1 and 2, after "claim 1" and before "homopolyme please insert ---wherein said emulsified mixture further comprises a--

Signed and sealed this 23rd day of May 1972.

(SEAL)
Attest:

EDWARD M. FLETCHER, JR.
Attesting Officer

ROBERT GOTTSCHALK
Commissioner of Patents